United States Patent
Musha et al.

(10) Patent No.: US 8,202,626 B2
(45) Date of Patent: Jun. 19, 2012

(54) BRASS-PLATED STEEL WIRE FOR REINFORCING RUBBER ARTICLES AND METHOD FOR MANUFACTURING THE SAME

(75) Inventors: Shinichi Musha, Tokyo (JP); Kiyotaka Sueyoshi, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 565 days.

(21) Appl. No.: 12/282,064

(22) PCT Filed: Aug. 30, 2006

(86) PCT No.: PCT/JP2006/317122
§ 371 (c)(1),
(2), (4) Date: Jan. 8, 2009

(87) PCT Pub. No.: WO2007/102233
PCT Pub. Date: Sep. 13, 2007

(65) Prior Publication Data
US 2009/0155620 A1    Jun. 18, 2009

(30) Foreign Application Priority Data

Mar. 8, 2006   (JP) .................................. 2006-062287

(51) Int. Cl.
*B32B 15/02* (2006.01)
*B32B 15/18* (2006.01)
*B32B 15/20* (2006.01)
*B21C 1/00* (2006.01)
*B32B 15/16* (2006.01)

(52) U.S. Cl. ............ 428/607; 428/625; 428/677; 72/47; 148/532; 427/357; 205/222

(58) Field of Classification Search .................. None
See application file for complete search history.

(56) References Cited

U.S. PATENT DOCUMENTS

| | | | | |
|---|---|---|---|---|
| 2,026,605 | A | * | 1/1936 | Antisell ..................... 148/518 |
| 2,196,002 | A | * | 4/1940 | Whitney et al. .............. 29/527.2 |
| 2,317,350 | A | * | 4/1943 | Adler et al. .................. 428/636 |
| 4,952,249 | A | * | 8/1990 | Dambre ....................... 205/210 |
| 2009/0288747 | A1 | * | 11/2009 | Miyazaki et al. ............. 152/451 |
| 2010/0294013 | A1 | * | 11/2010 | Matsuyama ................... 72/278 |

FOREIGN PATENT DOCUMENTS

| | | |
|---|---|---|
| EP | 0179517 A1 | 4/1986 |
| EP | 0230071 A1 * | 7/1987 |
| EP | 0292039 A1 | 11/1988 |
| EP | 1 967 645 A1 | 9/2008 |
| JP | 61117287 A | 6/1986 |
| JP | 62-282087 A | 12/1987 |
| JP | 62-285926 A | 12/1987 |
| JP | 63-145102 A | 6/1988 |
| JP | 63-288283 A | 11/1988 |

(Continued)

OTHER PUBLICATIONS

European Search Report dated Apr. 13, 2010 (6 pages).
Chinese Office Action issued in Application No. 200680053753.2 dated Mar. 11, 2011.
Zeng Guozhen, "Production Technology Research of Electroplating Low-Sn-bronze for Tempered Bead Wire," Steel Wire Products, Jun. 30, 2001, pp. 7-8, vol. 27, No. 3, China Academic Journal Electronic Publishing House.

(Continued)

*Primary Examiner* — John J Zimmerman
(74) *Attorney, Agent, or Firm* — Sughrue Mion, PLLC

(57) ABSTRACT

A brass-plated steel wire for reinforcing rubber articles capable of surely improving adhesiveness between brass-plated steel wire and rubber and a method for manufacturing the same.

12 Claims, 4 Drawing Sheets

FOREIGN PATENT DOCUMENTS

| | | | |
|---|---|---|---|
| JP | 199714 A | | 4/1989 |
| JP | 5255833 A | | 10/1993 |
| JP | 10-226844 A | | 8/1998 |
| JP | 2003-231992 A | | 8/2003 |
| JP | 2008-063687 | * | 3/2008 |
| JP | 2008-261073 | * | 10/2008 |
| JP | 2009-108440 | * | 5/2009 |
| JP | 2010-159515 | * | 7/2010 |

OTHER PUBLICATIONS

Japanese Office Action issued in Application No. 2006-062287 dated Jul. 1, 2011.

* cited by examiner

FIG. 3
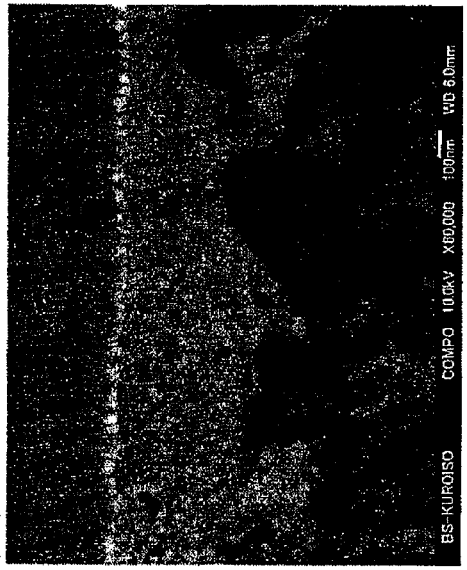
(a) EXAMPLE 2
(b) EXAMPLE 3
(c) COMPARATIVE EXAMPLE 2

FIG. 4

| | AREA PERCENTAGE A (%) | VOLUME PERCENTAGE B (%) | INITIAL ADHESIVENESS (INDEX) | ADHESION DURABILITY (INDEX) |
|---|---|---|---|---|
| EXAMPLE 2 | 98 | 45 | 200 | 150 |
| EXAMPLE 3 | 98 | 85 | 200 | 80 |
| COMPARATIVE EXAMPLE 2 | 60 | 15 | 100 | 100 |

BRASS-PLATED STEEL WIRE FOR REINFORCING RUBBER ARTICLES AND METHOD FOR MANUFACTURING THE SAME

TECHNICAL FIELD

The present invention relates to a brass-plated steel wire for reinforcing rubber articles which is used as wires or the like for steel cords for tire reinforcement and more particularly to the improvement of adhesiveness between the brass-plated steel wire and the rubber.

BACKGROUND ART

Steel wires for reinforcing rubber articles to be used as wires or the like for steel cords for tire reinforcement have conventionally been brass-plated steel wires having a brass-plating layer formed on their surface. These brass-plated steel wires are fabricated by cold-drawing a steel wire material, having been heat-treated by patenting or the like and brass-plated, to a predetermined wire diameter.

As for adhesiveness between brass-plated steel wire and rubber, it is known, for instance, that in the vulcanization (curing) process of tire production, an adhesion layer is formed when the steel wire is heated in contact with rubber and thereby sulfur in the rubber reacts with copper in the brass plating. And properties required of this adhesion layer are such that the adhesion layer must be formed quickly and reliably in the vulcanization process (initial adhesion performance) and the adhesion layer must not deteriorate due to moisture or heat during the use of the rubber article (adhesion durability performance).

Conventionally known methods for improving adhesion of brass-plated steel wire for reinforcing rubber articles to rubber include a method for alloying the surface layer by adding an alloy element, such as Fe or Ni, to the plating components (see References 1 and 2, for instance), a method for surface-treating by performing a plasma irradiation on the brass-plated steel wire (see Reference 3, for instance), a method for controlling the oxygen rate in the topmost surface of the plating layer (see Reference 4, for instance), and a method of performing a blast finishing after wire drawing (see Reference 5, for instance).

Reference 1: Japanese Unexamined Patent Application Publication No. 8-209386
Reference 2: Japanese Unexamined Patent Application Publication No. 2002-13081
Reference 3: Japanese Unexamined Patent Application Publication No. 2003-160895
Reference 4: Japanese Unexamined Patent Application Publication No. 2004-68102
Reference 5: Japanese Unexamined Patent Application Publication No. H5-278147

DISCLOSURE OF THE INVENTION

Problems to be Solved by the Invention

The conventional methods as described above have shown certain degrees of improvement in adhesiveness, but have not fully satisfied both the initial adhesion performance and adhesion durability performance.

The present invention has been made in the view of the above conventional problems, and an object thereof is to provide a brass-plated steel wire for reinforcing rubber articles capable of reliably improving adhesiveness between the brass-plated steel wire and the rubber and a method for manufacturing the same.

Means for Solving the Problem

In accordance with a first aspect of the present invention, the invention provides a brass-plated steel wire for reinforcing rubber articles, comprising a steel wire having a brass-plating layer thereon, wherein the brass-plating layer has an amorphous portion formed of crystal grains having a grain size of 20 nm or less.

In accordance with a second aspect of the present invention, the invention provides a brass-plated steel wire for reinforcing rubber articles, comprising a steel wire having a brass-plating layer thereon, wherein the brass-plating layer is of a laminated structure of an amorphous portion on the surface side and a crystalline portion on the inner side, wherein the amorphous portion is formed of crystal grains having a grain size of 20 nm or less and the crystalline portion is formed of crystal grains having a grain size of more than 20 nm.

In accordance with a third aspect of the present invention, the invention provides a brass-plated steel wire for reinforcing rubber articles, wherein the volume percentage of the laminated structure in the whole of the brass-plating layer is 50% or more.

In accordance with a forth aspect of the present invention, the invention provides a brass-plated steel wire for reinforcing rubber articles, wherein the area percentage of the surface of the amorphous portion in the whole surface of the brass-plating layer is 80% or more.

In accordance with a fifth aspect of the present invention, the invention provides a brass-plated steel wire for reinforcing rubber articles, wherein the area percentage of the surface of the amorphous portion of the laminated structure in the whole surface of the brass-plating layer is 20% or more and wherein the volume percentage of the amorphous portion of the laminated structure in the whole of the laminated structure is in a range of 20% to 80%.

In accordance with a sixth aspect of the present invention, the invention provides a method for manufacturing a brass-plated steel wire for reinforcing rubber articles, the method comprising forming a crystalline brass-plating layer on the surface of a steel wire, and thereafter forming an amorphous brass-plating layer on the surface of the crystalline brass-plating layer, whereby a brass-plating layer of a laminated structure comprising a crystalline under layer and an amorphous surface layer is formed on the surface of the steel wire.

In accordance with a seventh aspect of the present invention, the invention provides a method for manufacturing a brass-plated steel wire for reinforcing rubber articles, the method comprising forming a crystalline brass-plating layer on the surface of a steel wire, and thereafter performing a heavy-working on the extreme surface layer only of the crystalline brass-plating layer, whereby a brass-plating layer of a laminated structure consisting of a crystalline under layer and an amorphous surface layer is formed on the surface of the steel wire.

Effect of the Invention

A brass-plated steel wire according to the present invention has a brass-plating layer formed on its surface, which includes an amorphous portion formed of crystal grains having a grain size of 20 nm or less. For example, an amorphous brass-plating layer may be formed on the surface of steel wire having a crystalline brass plating thereon or an amorphous brass-plating layer may be formed in the brass-plating layer by performing a heavy-working on the extreme surface only of steel wire having a crystalline brass plating formed thereon, so that the brass-plated steel wire displays an excellent initial adhesion performance relative to rubber.

A brass-plated steel wire having a laminated structure of an amorphous portion on the surface side and a crystalline portion on the inner side provides a brass-plated steel wire displaying an excellent adhesion durability performance.

A brass-plated steel wire for which the volume percentage of the laminated structure in the whole of the brass-plating layer is 50% or more provides a brass-plated steel wire displaying both an excellent initial adhesion performance and an excellent adhesion durability performance.

A brass-plated steel wire for which the area percentage of the surface of the amorphous portion in the whole surface of the brass-plating layer is 80% or more provides a brass-plated steel wire displaying a more excellent initial adhesion performance.

A brass-plated steel wire for which the area percentage of the surface of the amorphous portion of the laminated structure in the whole surface of the brass-plating layer is 20% or more and the volume percentage of the amorphous portion of the laminated structure in the whole of the laminated structure is in a range of 20% to 80% provides a brass-plated steel wire which excels both in initial adhesion performance and adhesion durability performance.

According to a method for manufacturing a brass-plated steel wire for reinforcing rubber articles of the present invention, a brass-plated steel wire displaying an excellent adhesion performance relative to rubber can be fabricated.

BRIEF DESCRIPTION OF THE DRAWINGS

FIG. 3 is image comparing the cross sections of brass-plated steel wires of Examples 2 and 3 and Comparative Example 2.

FIG. 4 is a table showing the results of adhesion performance evaluation of Examples 2 and 3 and Comparative Example 2.

Figure 1:
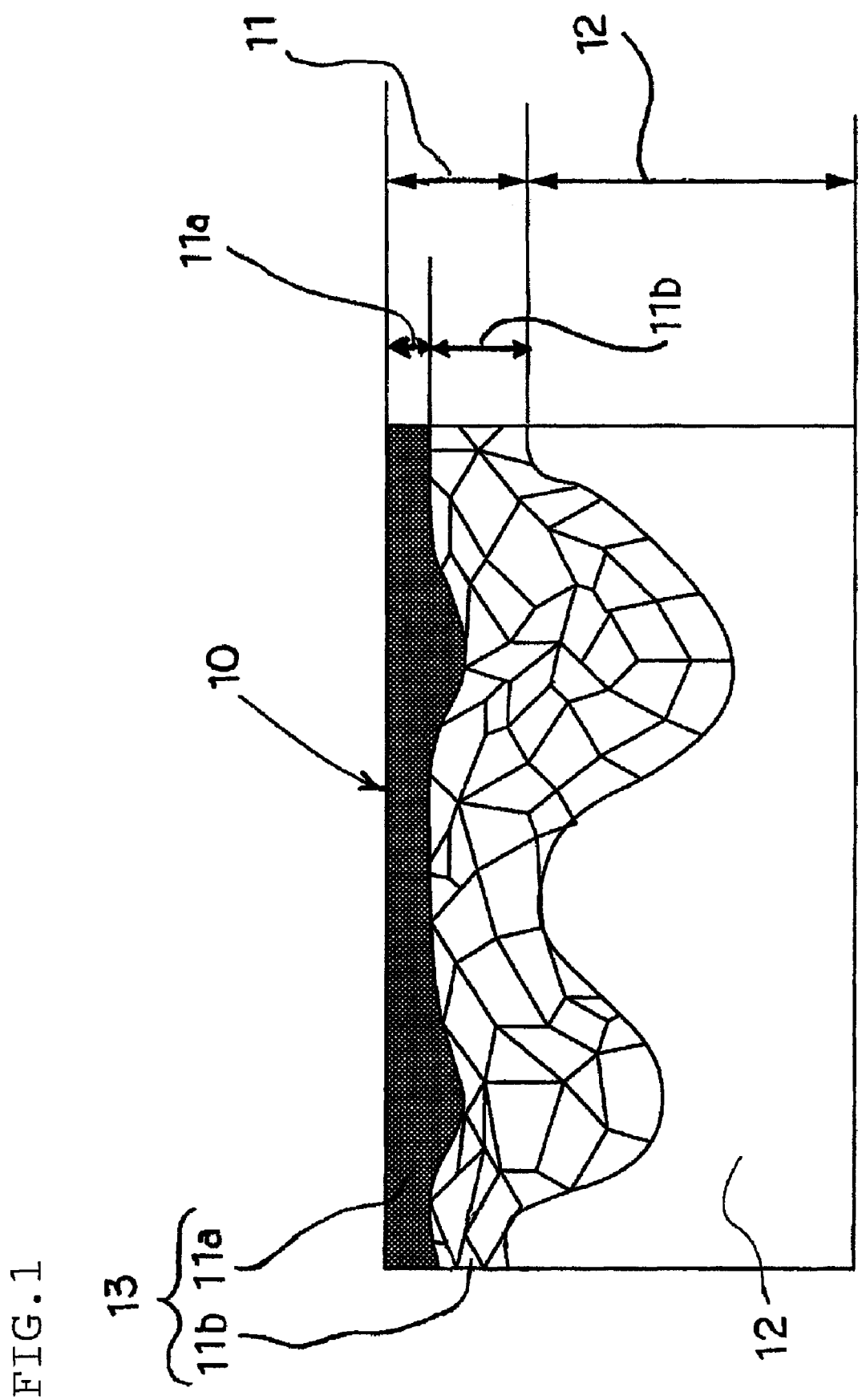
FIG. 1 is a schematic illustration showing a cross section of a brass-plated steel wire.

REFERENCE NUMERALS 10 brass-plated steel wire
11 brass-plating layer
11a amorphous portion
11b crystalline portion
12 steel wire
13 Laminated structure

BEST MODE FOR CARRYING OUT THE INVENTION

Embodiment 1

Embodiment 1 of the present invention is described hereinbelow with reference to FIGS. 1 and 2.

Figure 2:
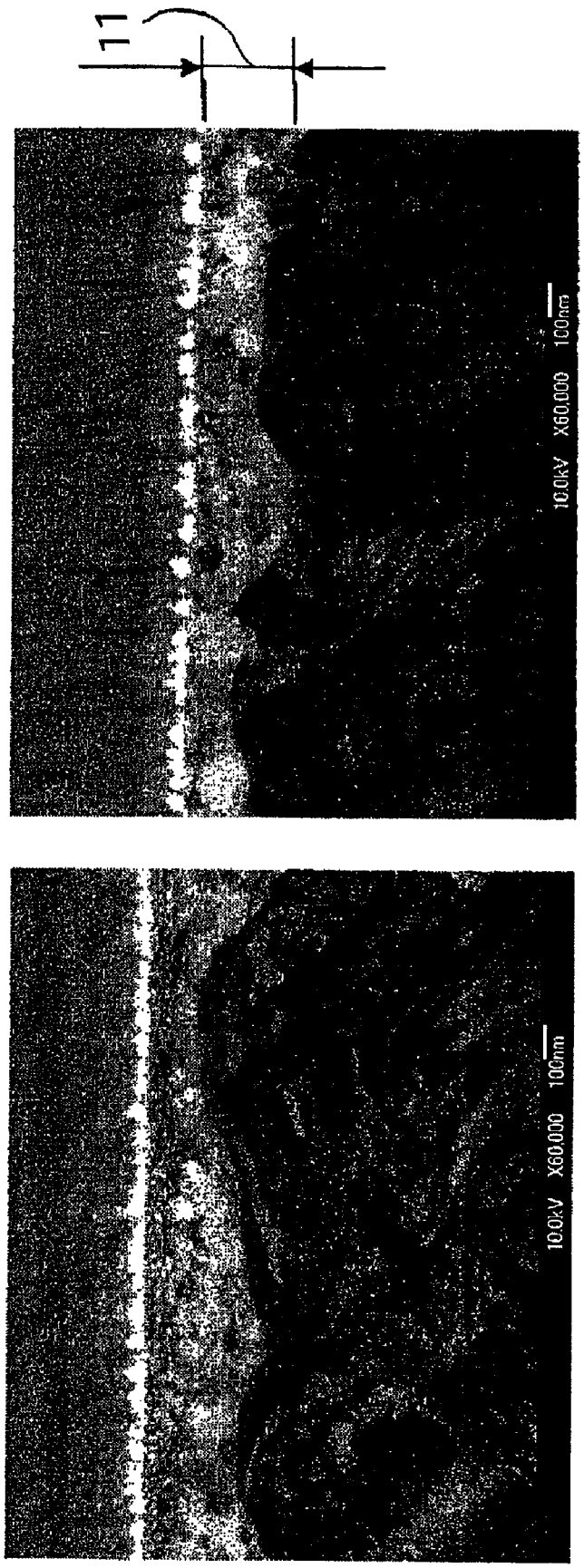
FIG. 2 is image comparing the cross sections of brass-plated steel wires of Example 1 and Comparative Example 1.

Referring to FIG. 1, a description is given of a brass-plated steel wire 10. The brass-plated steel wire 10 includes a steel wire 12 and a brass-plating layer 11 formed thereon. This brass-plating layer 11 has a laminated structure 13 of an amorphous portion 11a on the surface side and a crystalline portion 11b on the inner side. The amorphous portion 11a is a portion which is substantially amorphous with a feature of undistinguishable crystal grains. The crystal grains forming the amorphous portion 11a may be fine crystal grains of 20 nm or less. The crystalline portion 11b is a portion formed of crystal grains having a grain size of 20 nm or more. For example, in terms of backscattered electron beam patterns obtained, the crystalline portion 11b presents a well-defined Kikuchi pattern corresponding to the crystal orientation while the amorphous portion 11a does not because it has no well-defined crystal structure.

In Embodiment 1, it is determined such that the area percentage of the surface of the amorphous portion 11a of the laminated structure 13 in the whole surface of the brass-plating layer 11 (hereinafter referred to as area percentage A) is preferably 80% or more and the volume percentage of the laminated structure 11 in the whole of the brass-plating layer 11 (hereinafter referred to as volume percentage A) is preferably 50% or more.

The brass-plated steel wire 10 according to Embodiment 1, which has a brass-plating layer 11 having a laminated structure 13 of an amorphous portion 11a on the surface side and a crystalline portion 11b on the inner side, provides the following advantageous effects.

The amorphous portion 11a of the brass-plating layer 11 has an extremely high concentration of lattice defect, so that it displays a high degree of activity and a high diffusion speed of Cu atoms. Hence, in the manufacture of a tire using the brass-plated steel wire 10 as wires for the steel cords for tire reinforcement, an adhesive action between brass-plated steel wire 10 and rubber progresses quickly in the vulcanization (curing) process in which the brass-plated steel wire 10 is heated with the amorphous portion 11a thereof in contact with the rubber. Thus, an adhesion layer between brass-plated steel wire 10 and rubber is formed quickly in the vulcanization process, resulting in an improvement in initial adhesion performance (hereinafter referred to as Effect 1). In other words, Embodiment 1 provides a brass-plated steel wire 10 which displays an excellent initial adhesion performance.

Also, even when a tire after the formation of the adhesion layer is placed in an environment where Cu atoms are consumed rapidly at the adhesive interface (e.g., high temperature and high humidity), Cu atoms are rapidly supplied from the amorphous portion 11a, so that rarefaction of Cu atoms in the adhesion layer is prevented and a strong adhesion layer is retained.

Note also that the crystalline portion 11b of the brass-plating layer 11 exhibits a lower degree of activity and a slower diffusion speed of Cu atoms than those of the amorphous portion 11a. Accordingly, when the brass-plating layer 11 is structured only with an amorphous portion 11a of high degree of activity, then the interface between brass plating and steel is liable to weaken in an aggravating high-humidity, high-temperature environment, thus triggering an eventual fracture. In Embodiment 1, on the other hand, the brass-plating layer 11 is provided with a crystalline portion 11b, which leads to an improvement in adhesion durability performance. In other words, the brass-plating layer 11 has a crystalline portion 11b capable of inducing a gentle adhesive action with rubber, so that the copper is not exhausted early even when reactions occur due to moisture or heat during the use of a rubber article such as a tire. As a result, adhesion durability is retained (hereinafter referred to as Effect 2).

According to Embodiment 1, therefore, a brass-plated steel wire 10 displaying both excellent initial adhesion and adhesion durability can be provided.

The brass-plated steel wire 10 according to Embodiment 1 can be manufactured, for example, by performing a heavy-working on the extreme surface only of the brass-plating layer of a steel wire 12 having a crystalline brass plating formed thereon so as to transform the surface of the brass-plating layer into an amorphous portion 11a.

The heavy-working on the extreme surface of the brass-plating layer may be accomplished by wire drawing through dies, for instance.

It is known that when lubrication in the wire drawing is insufficient, a heavy-worked layer may occur on the surface of the drawn wire material as the drawn wire material comes in contact with the drawing tool directly or through an incomplete film. This heavy-worked layer is where an extremely high density of lattice defect is introduced. The formation of such a heavy-worked layer is generally considered to present problems such as falling-off of brass plating, degradation of steel wire material, broken wire or worn dies. However, it is possible that an extremely thin heavy-worked layer can be formed on the extreme surface of the brass-plating layer by carrying out a wire drawing with lubricity lowered in some degree.

For example, in performing a wire drawing with lubricity lowered in some degree by a wet drawing using a liquid lubricant, the concentration of lubricating components in the liquid lubricant may be lowered below that used for ordinary wire drawing or the temperature of the liquid lubricant may be lowered below the recommended service temperature of the liquid lubricant.

In what degree the lubricity is to be lowered for wire drawing depends on the desired strength and/or wire diameter of the steel wire to be manufactured. However, when the concentration of lubricating components is to be lowered, for instance, the concentration is preferably in a range of 80% to 20% of that of the liquid lubricant used in ordinary drawing of steel wire. Note that the lubricity lowered excessively can cause the falling-off of brass plating, degradation of steel wire material, broken wire or worn dies, whereas the lubricity lowered insufficiently may reduce the adhesiveness because of a reduced ratio of the amorphous portion 11a in the surface of the brass-plating layer.

Also, excessive heating during the process of wire drawing may present possibilities of reduced concentration of lattice defect or worsened ductility of steel wire on account of a temperature rise of the brass plating. Therefore, it is preferable that wire drawing conditions such as follows are set to reduce heating and the temperature of steel wire exiting from the dies is 150° C. or below as measured by a contact-type thermometer:

Wire drawing conditions
  The area reduction rate per die is set relatively low.
  The wire drawing speed is set relatively low.
  The dies are cooled to control temperature rise.
  The wire material entering dies and/or the wire material exiting dies are cooled.

In so doing, it is preferable that the brass-plating layer is a little on the thick side in order to form a laminated structure of an amorphous portion and a crystalline portion.

Also, in the manufacture using a wet-type continuous wire drawing, the wire drawing at the finishing die or at the finishing die and several dies downstream thereof may be carried out with the lubricity lowered in some degree, and at the same time the wire drawing at the other dies may be done in well-lubricated conditions. Then it is possible to reliably manufacture a brass-plating layer consisting of a crystalline portion on the inside and an amorphous portion on the surface.

As described above, according to Embodiment 1, a brass-plated steel wire is drawn with lubricity lowered in some degree, and thereby a brass-plated steel wire 10 is formed which has a laminated structure 13 of an amorphous portion 11a and a crystalline portion 11b on the surface of a steel wire 12 and which has a brass-plating layer 11 with an area percentage A of 80% or above and a volume percentage of 50% or above. As a result, a brass-plated steel wire 10 displaying both excellent initial adhesion performance and adhesion durability performance is provided.

Note that according to Embodiment 1, a steel wire with a crystalline brass-plating layer formed thereon is drawn with the lubricity lowered in some degree so as to form a brass-plating layer 11 which is crystalline on the inside and amorphous on the surface. However, after forming a crystalline brass-plating layer on the surface of a steel wire, an amorphous brass-plating layer may be formed on the surface of the crystalline brass-plating layer, for instance, by a plasma CVD or the like, so that the brass-plating layer may have a laminated structure consisting of a crystalline under layer and an amorphous surface layer. In such a case, the topmost surface of the brass-plating layer can be turned substantially amorphous while the crystallinity of the interior thereof is retained satisfactorily.

Example of Embodiment 1

A brass-plated steel wire drawn with lubricity lowered in some degree (Example 1) and a brass-plated steel wire drawn under conventionally satisfactory lubrication conditions (Comparative Example 1) were fabricated. FIGS. 2A and 2B show the cross sections of brass-plated steel wires of Example 1 and Comparative Example 1, respectively, in which the area percentage A of the brass-plated steel wires of Example 1 is 96% whereas that of the brass-plated steel wires of Comparative Example 1 is 56%. The area percentage A was calculated from the degree in which the backscattered electron beam pattern obtained of the surface of the fabricated brass-plated steel wire shows a well-defined Kikuchi pattern corresponding to the crystal orientation of Cu. Note also that all the brass-plated steel wires used in the testing were 0.300 mm in wire diameter, 3200 MPa in tensile strength, and 3.5 g in the adhesion amount of brass plating per 1 kg of the steel wire.

From examinations of the adhesiveness of these steel wires to rubber, it was confirmed that the brass-plated steel wires of Example 1 exhibit better results both in initial adhesion performance and adhesion durability than those of brass-plated steel wires of Comparative Example 1.

Embodiment 2

A brass-plated steel wire 10 displaying excellent initial adhesion performance and adhesion durability performance relative to rubber was obtained when the area percentage A was 20% or more and the volume percentage of the amorphous portion of the laminated structure in the whole of the laminated structure (hereinafter referred to as volume percentage B) was in a range of 20% to 80%. When the area percentage A was less than 20%, the effect as explained in the aforementioned Effect 1, namely, an excellent initial adhesion performance, could not be achieved. Also, when the volume percentage B was less than 20%, it was found difficult to retain a strong adhesion layer, and further when the volume percentage B was in excess of 80%, the effect as explained in the aforementioned Effect 2, namely, an excellent adhesion durability performance, could not be obtained. On the other hand, when the volume percentage B was in a range of 25% to 75%, an even more excellent adhesion durability performance was achieved. Also, when the area percentage A was more than 80%, the initial adhesion performance was further improved. When the area percentage A was less than 20%, the effects as explained in the aforementioned Effect 1 and Effect 2, namely, excellent initial adhesion performance and adhesion durability performance, could not be obtained. Further, when the volume percentage B was less than 20%, the effect as explained in the aforementioned Effect 1, namely, an excellent initial adhesion performance, could not be obtained. Also, when the volume percentage B was less than 20%, the effects as explained in the aforementioned Effect 1 and Effect 2, namely, excellent initial adhesion performance and adhesion durability performance, could not be obtained. Further, when the volume percentage B was in excess of 80%, the effect as explained in the aforementioned Effect 2, namely, an excellent adhesion durability performance, could not be obtained. On the other hand, when the volume percentage B was in a range of 25% to 75%, even more excellent initial adhesion performance and adhesion durability performance were achieved. Also, when the area percentage A was more than 80%, the initial adhesion performance was further improved.

Example of Embodiment 2

Brass-plated steel wires having different area percentages A and volume percentages B were fabricated, and their adhesion performance was evaluated. The area percentage A was calculated from the degree in which the backscattered electron beam pattern obtained of the surface of the fabricated brass-plated steel wire shows a well-defined Kikuchi pattern corresponding to the crystal orientation of Cu. The volume percentage B was calculated by carrying out an image analysis on the cross-sectional observation images of the fabricated brass-plated steel wires. FIG. 3 shows cross sections of brass-plated steel wires drawn with lubricity lowered in some degree (Examples 2 and 3) and a cross section of a brass-plated steel wire drawn under conventionally satisfactory lubrication conditions (Comparative Example 2), and FIG. 4 shows the respective area percentages A and volume percentages B calculated by techniques as explained above. The adhesion performance was evaluated as follows. To evaluate initial adhesion, steel cords were first fabricated by twisting brass-plated steel wires of 0.30 mm in wire diameter into a 1×3 structure, and then they were arranged in parallel with one another at equal intervals and coated with rubber from both sides. Then after 7 to 20 minutes of vulcanization at 160° C., the steel cords were peeled off the rubber of the thus obtained composite material of rubber and steel cords. At this time, the rubber adherence rate was measured, and the results are shown by indexes in relation to 100 of Example 2. As they indicate, the larger the numerical values, the more excellent the adhesiveness is. Also, to evaluate the adhesion durability, steel cords were first coated with rubber the same way as in the evaluation of the initial adhesiveness. Then after 20 minutes of vulcanization at 160° C., the obtained composite material of rubber and steel cords was left standing in an ambience of atmospheric pressure and a temperature of 75° C. and a humidity of 95% for 7 to 14 days. Then the steel cords were peeled off the rubber to measure the rubber adherence rate, and the results are shown by indexes in relation to 100 of Comparative Example 2. As they indicate, the larger the numerical values, the more excellent the adhesiveness is. Shown in FIG. 4 are the results of the respective evaluations. The brass-plated steel wire of Example 2 whose area percentage A is 98% and volume percentage B is 45% satisfies the conditions as explained in Embodiment 2, that is, the conditions of the area percentage A being 80% or more and the volume percentage B being in a range of 25% to 75%, displays better initial adhesion performance and adhesion durability performance than Comparative Example 2. With the brass-plated steel wire of Example 3 which does not satisfy the condition of the volume percentage B being 80% or less, the adhesion durability performance was worse than that of Comparative Example 2, and the effect of the aforementioned Effect 2 could not be obtained sufficiently.

INDUSTRIAL APPLICABILITY

Irrespective of the presence of a laminated structure 13, the larger the area percentage A is, the better the initial adhesion performance relative to rubber is. Hence, the area percentage A may be 100% also.

The invention claimed is:

1. A brass-plated steel wire for reinforcing rubber articles, comprising a steel wire having a brass-plating layer, wherein the brass-plating layer comprises a laminated structure portion formed by laminating a first portion on the surface side, which is formed by performing a heavy-working on an extreme surface only of the brass-plating layer of the steel wire having a crystalline brass plating, and a crystalline portion on the inner side, wherein the first portion is formed of crystal grains having a grain size of 20 nm or less or is a portion which is substantially amorphous with a feature of undistinguishable crystal grains and the crystalline portion is formed of crystal grains having a grain size of more than 20 nm.

2. A brass-plated steel wire for reinforcing rubber articles according to claim 1, wherein volume the percentage of the laminated structure in the whole of the brass-plating layer is 50% or more.

3. A brass-plated steel wire for reinforcing rubber articles according to claim 2, wherein the area percentage of the surface of the first portion in the whole surface of the brass-plating layer is 80% or more.

4. A method for manufacturing a brass-plated steel wire for reinforcing rubber articles according to claim 2, the method comprising:
forming a crystalline brass-plating layer on the surface of a steel wire, and
forming the first portion of the brass-plating layer on the surface of the crystalline brass-plating layer, whereby a brass-plating layer of a laminated structure comprising a crystalline under layer and the first portion of the brass-plating layer as a surface layer is formed on the surface of the steel wire.

5. A method for manufacturing a brass-plated steel wire for reinforcing rubber articles according to claim 2, the method comprising:
forming a crystalline brass-plating layer on the surface of a steel wire, and
performing a heavy-working on the extreme surface layer only of the crystalline brass-plating layer, whereby a brass-plating layer of a laminated structure having a crystalline under layer and a surface layer of undistinguishable crystal grains is formed on the surface of the steel wire.

6. A brass-plated steel wire for reinforcing rubber articles according to claim 1, wherein the area percentage of the surface of the amorphous portion of the laminated structure in the whole surface of the brass-plating layer is 20% or more and wherein the volume percentage of the amorphous portion of the laminated structure in the whole of the laminated structure is in a range of 20% to 80%.

7. A method for manufacturing a brass-plated steel wire for reinforcing rubber articles according to claim 5, the method comprising:

forming a crystalline brass-plating layer on the surface of a steel wire, and forming the first portion of the brass-plating layer on the surface of the crystalline brass-plating layer, whereby a brass-plating layer of a laminated structure comprising a crystalline under layer and the first portion of the brass-plating layer as a surface layer is formed on the surface of the steel wire.

8. A method for manufacturing a brass-plated steel wire for reinforcing rubber articles according to claim 6, the method comprising:

forming a crystalline brass-plating layer on the surface of a steel wire, and performing a heavy-working on the extreme surface layer only of the crystalline brass-plating layer, whereby a brass-plating layer of a laminated structure having a crystalline under layer and a surface layer of undistinguishable crystal grains is formed on the surface of the steel wire.

9. A brass-plated steel wire for reinforcing rubber articles according to claim 1, wherein the area percentage of the surface of the first portion in the whole surface of the brass-plating layer is 80% or more.

10. A method for manufacturing a brass-plated steel wire for reinforcing rubber articles according to claim 1, the method comprising:

forming a crystalline brass-plating layer on the surface of a steel wire, and forming the first portion of the brass-plating layer on the surface of the crystalline brass-plating layer, whereby a brass-plating layer of a laminated structure comprising a crystalline under layer and the first portion of the brass-plating layer as a surface layer is formed on the surface of the steel wire.

11. A method for manufacturing a brass-plated steel wire for reinforcing rubber articles according to claim 1, the method comprising:

forming a crystalline brass-plating layer on the surface of a steel wire, and performing a heavy-working on the extreme surface layer only of the crystalline brass-plating layer, whereby a brass-plating layer of a laminated structure having a crystalline under layer and a surface layer of undistinguishable crystal grains is formed on the surface of the steel wire.

12. A brass-plated steel wire for reinforcing rubber articles, comprising a steel wire having a brass-plating layer, wherein the brass-plating layer comprises a laminated structure portion formed by laminating a first portion on the surface side, which is formed by forming an amorphous brass-plated layer on a surface of the brass-plating layer of the steel wire having a crystalline brass plating, and a crystalline portion on the inner side, wherein the first portion is formed of crystal grains having a grain size of 20 nm or less or is a portion which is substantially amorphous with a feature of undistinguishable crystal grains and the crystalline portion is formed of crystal grains having a grain size of more than 20 nm.

* * * * *